Sept. 8, 1970  C. R. MOORE  3,527,121

CARRIER

Filed Aug. 26, 1968  2 Sheets-Sheet 1

INVENTOR.
Charles R. Moore
BY
a. M. Heiter
ATTORNEY

Sept. 8, 1970          C. R. MOORE           3,527,121
                         CARRIER
Filed Aug. 26, 1968                    2 Sheets-Sheet 2
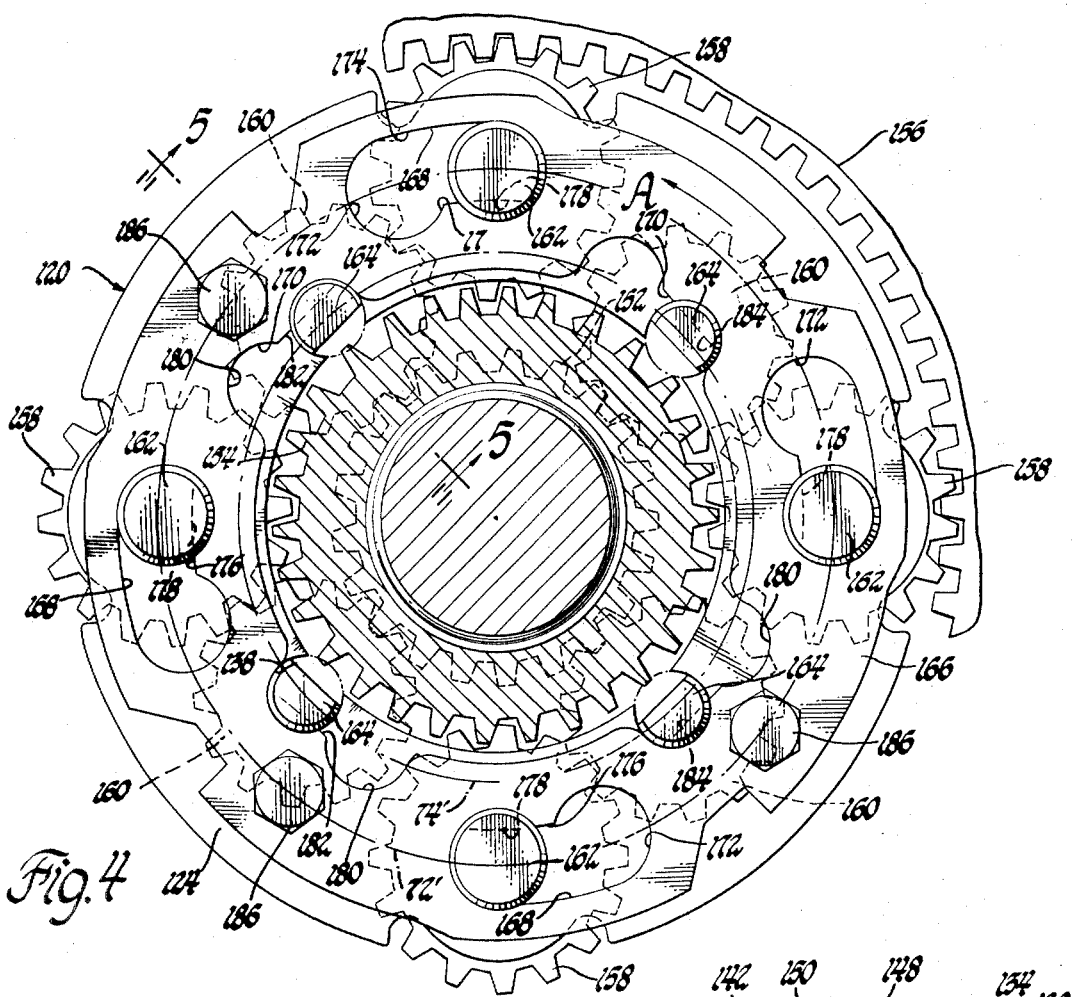
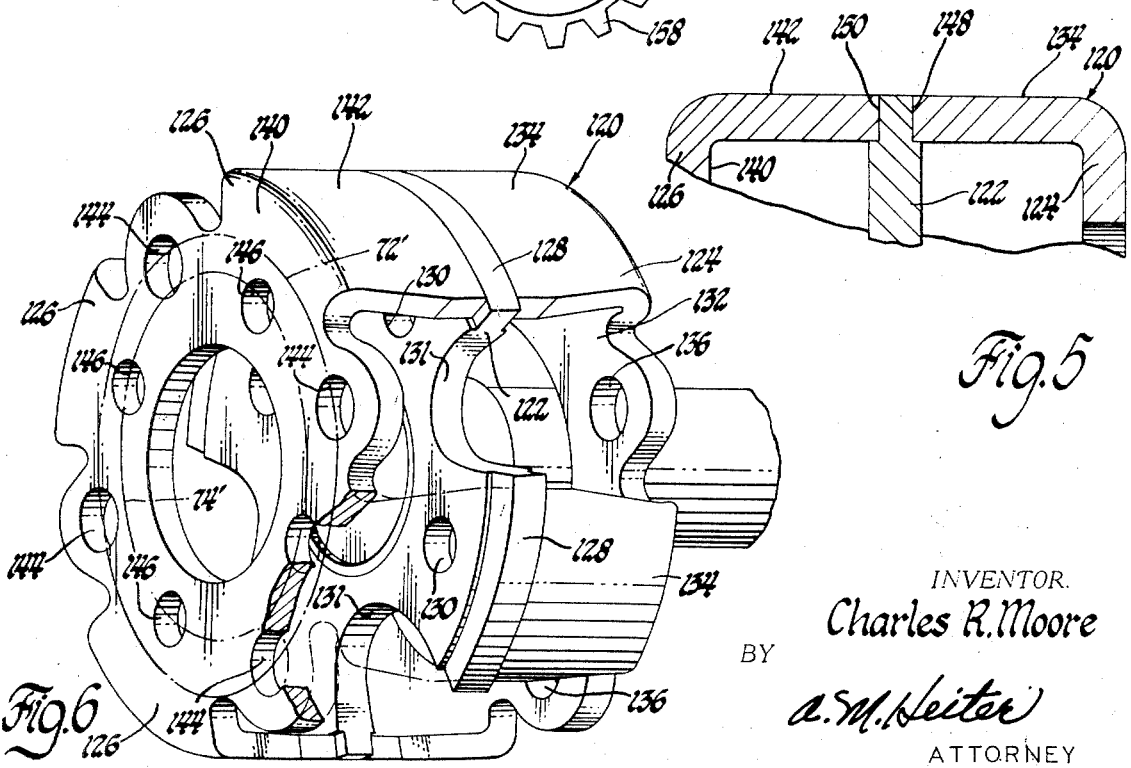
INVENTOR.
Charles R. Moore
BY
a.M. Heiter
ATTORNEY

United States Patent Office 3,527,121
Patented Sept. 8, 1970

3,527,121
CARRIER
Charles R. Moore, Grosse Pointe Park, Mich., assignor to General Motors Corporation, Detroit, Mich., a corporation of Delaware
Filed Aug. 26, 1968, Ser. No. 755,080
Int. Cl. F16h 3/62, 57/10
U.S. Cl. 74—760                                7 Claims

ABSTRACT OF THE DISCLOSURE

Shown and described in the following description and drawings is a sheet metal carrier which is a member of a planetary gear set adapted for use in a multi-ratio transmission. The carrier has a central sheet metal plate connected to the output shaft and two end wall sheet metal flanges which are secured to the central plate at a plurality of locations by peripheral sheet metal spacers. The sheet metal spacers may be separate from the flanges or be formed as continuous drum-like extensions of the flanges. The spacers are located, at spaced intervals, around the periphery of the flanges to provide openings in the carrier to permit the root diameter of the pinion gears carried therein to extend beyond the periphery of the carrier.

---

This invention relates to multi-ratio planetary gear transmissions and more particularly to the carrier member of the planetary gears.

Prior art carriers use a central member drivingly connected to a shaft and two outside members secured together and to the central member with the pinion mounting pins. Thus the pins not only carry the torque transmitted by the carrier but also must support gear end loading which results from the engaged gear teeth. This is especially true in modern planetary gears which use helical gear teeth.

In the present invention the location of the spacers or straps at the outer perimeter permits the use of more and larger diameter pinion gears for a minimum diameter carrier. The result of increasing the number and size of pinion gears is the transmission of higher torque components without increasing the overall size of the carrier. The structural strength of the carrier is also improved by locating the spacers at the outer perimeter since this permits the use of a spacer having a longer circumferential portion without unduly limiting the size, number and location of the pinion gears.

Also, this carrier can be completely fabricated from sheet metal components before the pinion gears are installed since it does not rely on the pinion pins to secure the central and outside members together. This construction also provides a more rigid carrier which can be used in planetary gearings having an internal toothed or ring gear input and a central ouptut from the carrier.

It is therefore an object of this invention to provide in a transmission an improved carrier having a central output member and two flange members secured only at their perimeter to the perimeter of the central member.

It is a further object of this invention to provide in a transmission an improved carrier having a central output member and two outside end wall members secured thereto in a manner such that pinion gears mounted within the carrier are premitted to extend beyond the outer periphery thereof to engage another gear member.

Other objects and advantages of the invention will become apparent from the following description of the annexed drawings in which:

FIG. 4 is an end view similar to FIG. 2 showing a modified carrier;

FIG. 5 is a sectional view taken along line 5—5 in FIG. 4; and

FIG. 6 is an isometric view of the modified carrier.

Figure 1:
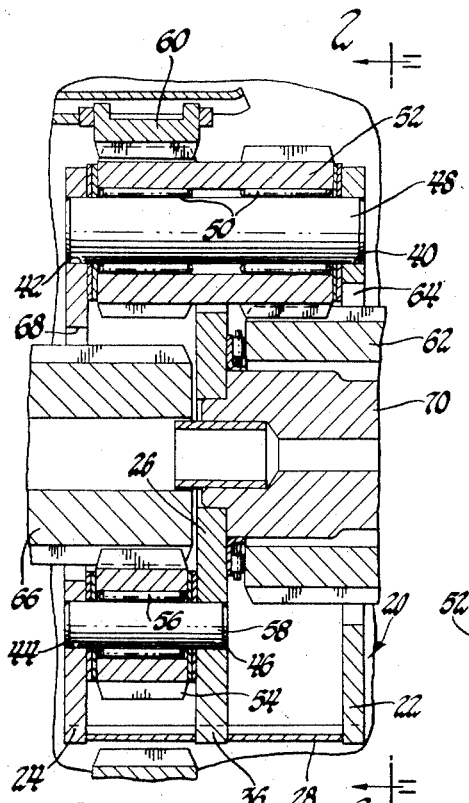
FIG. 1 is a sectional elevation view showing the planetary gearing.
Figure 2:
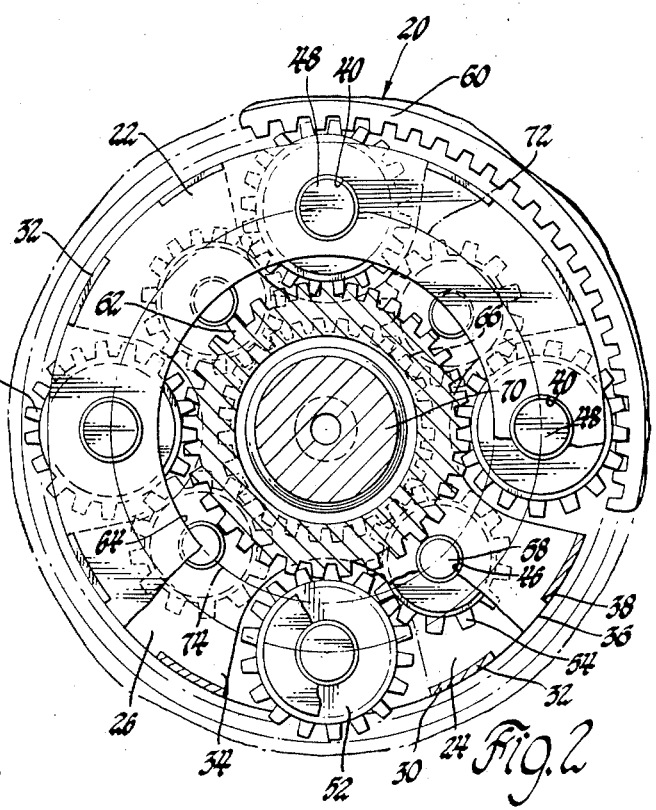
FIG. 2 is an end view partly in section as seen from line 2—2 in FIG. 1.
Figure 3:
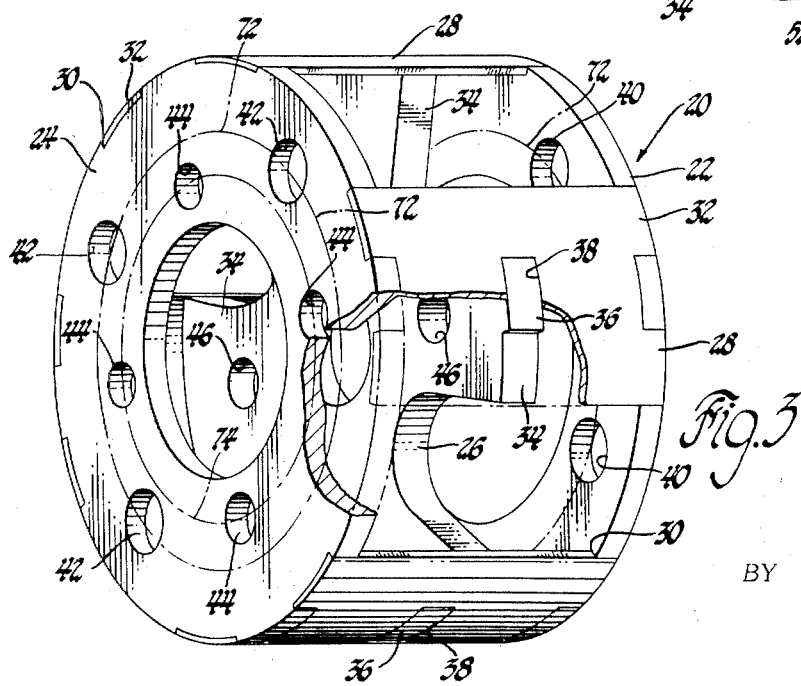
FIG. 3 is an isometric view of the carrier.

Referring to the drawings and particularly to FIGS. 1, 2 and 3, there is shown a carrier 20 having two equal outer diameter sheet metal flanges or end walls 22 and 24, a sheet metal central plate 26 and a plurality of sheet metal spacers or straps 28. The flanges 22 and 24 have slots 30 into which are fitted tangs 32 of the spacers 28 which are segments of cylinders having an annular cross-section. The central plate 26 has a plurality of lobe portions 34, each having a tang 36 at the perimeter thereof. The tangs 36 are located in slots 38 of the spacers or supports 28. The spacers 28 are secured, preferably by welding, to the flanges 22 and 24 and the central plate 26, thus supporting the flanges on the central plate in a balanced cantilever manner and providing the unitized sheet metal carrier 20. The flanges 22 and 24 each have a plurality of apertures 40 and 42, respectively, which are axially aligned substantially central of the openings between adjacent lobes 34 of the central plate 26. The flange 24 also has a plurality of apertures 44 which are axially aligned with apertures 46 in the lobe portions 34.

As seen in FIG. 1, long pinion pins 48 are secured in the apertures 40 and 42 and have rotatably mounted thereon, by bearings 50, long pinions 52. Meshing with the long pinions 52 are a plurality of short pinions 54 which are rotatably mounted by bearings 56 on short pins 58, which are secured in apertures 44 and 46. Also meshing with the long pinions 52 is a ring gear 60 which is outside the perimeter of the carrier 20 and a reaction sun gear 62 which extends through a central opening 64 in the flange 22. An input sun gear 66 meshes with the short pinions 54 and extends through a central opening 68 in the flange 24. An output shaft 70 is secured, preferably by welding, to the central plate 26 and extends leftward through the reaction sun gear 62.

The apertures 40 and 42 are located on a pin center circle 72, on flanges 22 and 24, between the center and outer perimeter thereof. The straps 28 are located adjacent the outer perimeter of the flanges 22 and 24 and have a circumferential dimension which permits the pin center circle 72 to be sufficiently distant from the center of flanges 22 and 24 so that the pinions 52 and 54 have the largest possible diameter for a given size carrier thus increasing the rigidity and torque capacity of the carrier. Also, the pin center circle 72 is so located to permit the root diameter of the long pinions 52 to extend slightly beyond the circumference of the strap 28 and the outer perimeter of flanges 22 and 24. Thus, when the straps 28 are located at a planetary gear set radius larger than the radius of the pin center circle and the radius to the outermost portion of the short pinions 54 and less than the root diameter of the ring gear 60, there is no carrier structure between the pinions requiring that the pinions be spaced; therefore a maximum number of pinions having a maximum size can be used in any gear set. Preferably the straps 28 are located just within the inside diameter of the ring gear so that they have a maximum circumferential width. This construction provides a planetary gear set of minimum size and maximum rigidity in relationship to the torque capacity.

The apertures 44 are also located on a pin center circle 74 on the flange 24. The diameters of the pinions 52 and 54 is such that the area between the pin center circles 72 and 74 is substantially filled by the pinions.

A modification of the carrier 20 is shown in FIGS. 4 and 6. The modified carrier 120 includes a central plate member 122 and two cup-shaped outside members 124 and 126. The central plate member 122 has a plurality of lobe portions 128, each having an aperture 130 therein and a gear opening 131 therebetween. The cup-shaped member 124 has a flange portion 132 and a plurality of spacer drum or supporting portions 134 which extend inwardly from the flange 132 and are welded to the central plate member 122 to support the flanges on the central plate. The flange portion 132 has a plurality of apertures 136 which are aligned with the gear openings 131 between the lobes 128 and a plurality of semicircular slots 138 at the inner periphery thereof which are aligned with the apertures 130. The drum portions 134 are discontinous between the lobes 128, thus providing an opening in the outer periphery of the carrier 120.

The cup member 126 is similar to the cup member 124 and has a flange portion 140 and a plurality of discontinuous drum portions 142, extending inwardly from the flange portion 140, which drum portions are also welded to the outer perimeter of the central plate 122. The flange portion 140 has a plurality of apertures 144 which are axially aligned with the apertures 136, and a plurality of apertures 146 which are aligned with the apertures 130 and the semi-circular slots 138. As seen in FIG. 5, the central plate 122 has two grooves 148 and 150 at its outer perimeter in which are located the inner edges of drum portions 142 and 134.

The carrier 120 is the output member of a planetary gear set, as shown in FIG. 4, which is similar to the planetary gear set as described above and shown in FIGS. 1 and 2. The planetary gear set includes an input sun gear 152, a reaction sun gear 154, an input and reaction ring gear 156, a plurality of long pinion gears 158 meshing with the sun gear 154 and the ring gear 156, and a plurality of short pinions 160 meshing with the sun gear 152 and the long pinions 158. The long pinions 158 are rotatably mounted on pins 162 which are located in apertures 136 and 144, thus locating the long pinions in the gear openings 131 between the lobe portions 128. The short pinions 160 are rotatably mounted on pins 164 between cup member 126 and the central plate 122. The pins 164 are located in the apertures 146 and 130 and in the semi-circular slots 138.

The axial location of the pins 162 and 164 is maintained by a locking plate 166 which has a plurality of locking slots 168 and cam slots 170. The locking slots 168 have a circular portion 172, a diameter portion 174, which is tangential with the circular portion 172 and the pin 162, and a locking portion 176 which engages a groove 178 in the pin 162. The cam slot 170 has a circular portion 180 and a cam portion 182 which engages a slot 184 in the pins 164. After the pinions 158 and 160 have been mounted in the carrier on the pins 162 and 164 respectively, the locking plate 166 is placed over the pins so that circular portions 172 and 180 are aligned with the pins 162 and 164. The locking plate 166 is then rotated in the direction of arrow A until locking portion 176 engages slot 178 and cam portion 182 engages slot 184. The locking plate 166 is then secured to cup member 124 with a plurality of fasteners 186.

The apertures 136 and 144 are located on a pin center circle 72' and the apertures 146 are located on a pin center circle 74' in a manner similar to that described above for the carrier 20. Therefore, the carrier 120 has the same compactness and high torque capacity as that described above for the carrier 20.

The planetary gear sets utilizing either carrier 20 or 120 are adaptable for use in a multi-ratio transmission such as that shown in U.S. patent application Ser. No. 759,671.

Modifications may be made of the above described illustrative embodiments by those skilled in the art without departing from the invention.

I claim:

1. In a transmission an input member; an output shaft; a planetary gear unit operatively connecting said input member and output shaft having an input sun gear operatively connected to said input member, a reaction sun gear and a ring gear and a welded sheet metal carrier assembly including a central circular plate member fixed on said output shaft between said sun gears, a pair of annular sheet metal stampings of substantially uniform thickness coaxially located on opposite sides of said plate and each having a cylindrical drum portion having the same diameter, a radial annular plate flange portion and a connecting radius portion substantially solely supporting said flange portion on the outer end of said drum portion and the other end of said drum portion being welded to said central plate at the perimeter of said central plate for supporting said drum portions coaxially on opposite sides of said plate providing a free unsupported radially inwardly extending flange terminating in a free unsupported inner diameter edge circumjacent to and providing clearance about said input and reaction sun gears and said flange portions being in coplanar axially spaced relation to said plate to provide a completely open annular space between each flange portion and the central member for pinions, a plurality of pairs of axially aligned short pinion shaft apertures in said plate member and one of said flange portions, a plurality of pairs of axially aligned long pinion shaft apertures in said flange portions nearer the outer perimeter than and between said short pinion shaft apertures, short pinion shafts in each pair of said short pinion shaft apertures, a short pinion on each of said short pinion shafts axially located between said central plate and said one flange portion and meshing with said input sun gear and one of said unsupported inner diameters being sufficiently large to permit assembly of said short pinions in said sheet metal carrier through said one inner diameter after welding, a long pinion shaft secured in each pair of said long pinion shaft apertures, a long pinion mounted on each of said long pinion shafts axially located between said flanges and meshing with said short pinions, openings in each cylindrical drum portion in close clearance relation permitting projection of said long pinions through said cylindrical drum portions for meshing with said ring gear and a recess in said central plate member providing clearance around each of said long pinions and said openings and said recess being sufficiently large to permit assembly of said long pinions in said sheet metal carrier through the outer perimeter of said sheet metal carrier after welding, and said cylindrical drum having an outer radius only slightly less than the maximum radial distance to the root diameter of said long pinions to provide a drum portion of maximum perimetral length.

2. In a transmission an input member; output shaft; a planetary gear unit operatively connecting said input member and output shaft having an input sun gear operatively connected to said input member; a reaction sun gear and a ring gear; and a welded sheet metal carrier assembly including a central circular plate member fixed to the end of said output shaft located between said sun gears and having an annular groove on each side of the plate at the outer perimeter and a plurality of recesses in the perimeter interrupting said grooves; a pair of annular sheet metal cup like stampings having a substantially uniform thickness and each having an equal diameter cylindrical drum portion having a diameter closely fitting within said ring gear, having one end fitting said recess to locate said cup like stampings relative to said plate member and welded to said plate member providing substantially the sole support for said cup like stampings on said plate member, a radial annular flange portion and a connecting radius portion connecting the other end of said drum portion and the outer perimeter of the annular flange portion to substantially solely support said annular flange portions at the outer perimeter on said drum portions on opposite sides of said plate member and said flange portions being free and unsupported and terminating at the inner diameter in a free and unsupported inner diameter edge in spaced relation to said sun gears, input member and output shaft; a plurality of axially aligned pairs of short pinion shaft apertures in the central plate member and one of the flange portions and short pinion shafts in said pairs of short pinion shaft apertures; a short pinion on each short pinion shaft axially located between the central plate member and the one flange portion meshing with said input sun gear and one of said unsupported inner diameters being sufficiently large to permit assembly of said short pinions in said sheet metal carrier through said one inner diameter after welding; a plurality of axially aligned pairs of long pinion shaft apertures in said flange portions radially outward of and between said short pinion shaft apertures and long pinion shafts in said pairs of long pinion shaft apertures, a long pinion mounted on each of said long pinion shafts axially located between said flange portions and meshing with said short pinions and ring gear, said pinion shafts being secured to a flange to hold said pinion shafts against rotary and axial movement relative to the flange without positively holding said flanges together, an aperture in each cylindrical drum portion and each long pinion having only slightly more than the tooth depth thereof projecting in close clearance relation through said cylindrical drum portions for meshing with said ring gear to provide maximum perimetral length of said drum, said recesses in the perimeter of said central plate member providing clearance around each of said long pinions and said openings and said recess being sufficiently large to permit assembly of said long pinions in said sheet metal carrier through the outer perimeter of said sheet metal carrier after welding, said long and short pinions being aranged in an annular series substantially without space therebetween.

3. In a transmission an input member; an output member; and planetary gear means operatively connected between said input member and said output member including first and second sun gear members and a ring gear and an output welded sheet metal carrier assembly including a central plate wall member secured to said output shaft between said sun gears having a plurality of clearance recesses with lobes therebetween in the outer perimeter thereof, spacer means including a plurality of spaced sheet metal spacer portions of uniform thickness providing an externally cylindrical lattice structure with openings between said portions axially aligned with said recesses and said spaced portions being centrally welded to said central plate wall member adjacent the outer perimeter thereof and extending in opposite directions on opposite sides of said central plate wall member, first and second sheet metal annular end walls of uniform thickness located on opposite sides of said central plate and laterally spaced therefrom supportingly connected to the ends of said spacer means adjacent the outer perimeter of said end walls to rigidly substantially entirely support said end walls and said end walls extending inwardly and terminating in a free and unsupported inner perimeter edge circumjacent to and providing clearance about said sun gears and an uninterrupted annular space between each end wall and said central plate member, a plurality of first pairs of axially aligned pin apertures in said end walls each axially aligned with a clearance recess in said central plate wall and an opening, a plurality of first pins positioned in said pairs of first pin apertures, a plurality of axially aligned second pin apertures in one of said end walls and said central plate member located annularly intermediate said first pin apertures, a plurality of second pins positioned in said pairs of second pin apertures, said first and second pins being substantially solely secured at said apertures to at least one of said walls to prevent rotary and axial movement of said pins relative to said walls and the securing of said pins being insufficient for securing and positioning of said walls relative to each other, a long pinion rotatably mounted on said first pins and axially located between said end walls and meshing with said ring gear and a sun gear and said openings and said recess being sufficiently large to permit assembly of said long pinions in said sheet metal carrier through the outer perimeter of said sheet metal carrier after welding, a short pinion mounted on said second pins and axially located between said one end wall and said central plate and meshing with another sun gear and said long pinion and one of said unsupported inner diameters being sufficiently large to permit assembly of said short pinions in said sheet metal carrier through said one inner diameter after welding, said spacer portions having an outer perimeter with a radius just within the radially outermost portion of the root diameter of the long pinions and being in close clearance with said long pinions so the spacer portions have a maximum perimetral length.

4. In a transmission an input member; an output shaft; and a planetary gear set operatively connected between said input member and said output shaft including an input sun gear operatively connected to said input member, a ring gear, a reaction sun gear, a welded sheet metal carrier assembly having a central plate member secured to said output shaft between said sun gears and having a plurality of gear recesses in the outer perimeter, a pair of stamped sheet metal annular plate flanges of substantially uniform thickness having unsupported free inner diameter edges circumjacent to and providing clearance about said input and reaction sun gears and located on each side of said plate member coaxially with said input and reaction sun gears, spacer means having stamped sheet metal portions of substantially uniform thickness spaced to provide an externally cylindrical lattice structure with openings therebetween and supportingly connected to said flanges and welded to said central plate about the outer perimeter of said flanges and said central plate member for balanced cantilever support of said flanges on said central plate member, a plurality of pairs of first apertures in said flanges axially aligned with said gear openings, a plurality of pairs of second apertures axially aligned and annularly intermediate said pairs of first apertures at a smaller radius in one of said flanges and in said central plate, first and second pin means secured in said first and second apertures respectively to prevent rotary and axial movement of said pins relative to said flanges and central plate without fully restraining said flanges, a plurality of long pinions rotatably mounted on said first pin means between said flanges and meshing with said ring gear and reaction sun gear and said openings and said recess being sufficiently large to permit assembly of said long pinions in said sheet metal carrier through the outer perimeter of said sheet metal carrier after welding, and a plurality of short pinions rotatably mounted on said second pin means between said one flange and said central plate and meshing with said input sun gear and said long pinions and one of said unsupported inner diameters being sufficiently large to permit assembly of said short pinions in said sheet metal carrier through said one inner diameter after welding; said first apertures being positioned on a first pin center circle a distance from the center of said flanges so a minimum portion of the root diameter of said long pinions extends outside the perimeter of said flanges and said central plate between said spacer means for meshing with said ring gear and said portions of said spacer means substantially completely filling the space between said long pinions.

5. In a transmission, an input member and output shaft, a planetary gear unit operatively connecting said input member and output shaft having an input sun gear operatively connected to said input member, a reaction sun gear and a ring gear and a sheet metal welded carrier assembly including a central circular plate member fixed on said output shaft between said sun gears, a pair of equal outer diameter annular sheet metal flanges of uniform thickness and having the same diameter as said plate member located on opposite sides of said central plate member and each having free unsupported inner diameter edge circumjacent to and providing clearance about said input sun gear and said reaction sun gear, a plurality of spaced sheet metal strap members of uniform thickness providing an externally cylindrical lattice structure with openings therebetween and secured to said flanges and centrally secured to said central plate member at the outer perimeter thereof to support said flanges on said central plate member in spaced relation on each side of said plate member to provide an open annular space between each flange and said plate member, a plurality of pairs of short pinion apertures in said central plate member and one of said flanges, a short pinion shaft in each pair of short pinion apertures and a short pinion on each of said short pinion shafts axially located between said plate and said one of said flanges and one of said unsupported inner diameters being sufficiently large to permit assembly of said short pinions in said sheet metal carrier through said one inner diameter after welding, a plurality of pairs of long pinion apertures in each of said flanges between said short pinion apertures, long pinion shafts secured in said long pinion apertures in each of said flanges, a long pinion mounted on each of said long pinion shafts located between said flanges, said long pinion shafts being positioned sufficiently distant from the center of said flanges for projection of only a minimal portion of the root diameter of said long pinions extending through said openings between said strap members for meshing with said ring gear and said straps filling the space between said long pinions and a recess in said central plate member providing clearance around each of said long pinions and said openings and said recess being sufficiently large to permit assembly of said long pinions in said sheet metal carrier through the outer perimeter of said sheet metal carrier after welding, and said long and short pinions substantially filling said annular space.

6. The invention defined in claim 3 and said spacer means being a drum portion integral with each of said end walls and welded to said lobe portions of said central plate and having a discontinuous perimeter between adjacent lobe portions of said central plate to provide an opening in the outer periphery of said carrier to permit said long pinions mounted inside said carrier to extend beyond the outer periphery to engage said ring gear.

7. The invention defined in claim 3 and said end walls having equal outer diameters and said spacer means being sheet metal straps of annular segments extending between and welded to said first and second end walls adjacent the outer diameter thereof, and being welded to said lobe portions of said central plate.

References Cited

UNITED STATES PATENTS

| | | | |
|---|---|---|---|
| 1,824,826 | 9/1931 | Marcus | 74—801 |
| 1,889,508 | 11/1932 | Zens | 74—803 |
| 2,150,950 | 3/1939 | Thoma | 74—763 X |
| 2,214,335 | 9/1940 | Kurti | 74—761 |
| 2,239,973 | 4/1941 | Ravigneaux | 74—761 X |
| 2,671,359 | 3/1954 | Scheiter | 74—763 X |
| 2,850,921 | 9/1958 | Knowles | 74—763 X |

DONLEY J. STOCKING, Primary Examiner

T. C. PERRY, Assistant Examiner

U.S. Cl. X.R.

74—761, 801